April 22, 1941.                D. EDWARDS                 2,239,486
                                 COMBINE
                           Filed April 30, 1940

Inventor
Desmond Edwards,
By Seymour, Bright + Nottingham
                                    Attorneys Patented Apr. 22, 1941

2,239,486

UNITED STATES PATENT OFFICE 2,239,486

COMBINE

Desmond Edwards, Galena, Ohio

Application April 30, 1940, Serial No. 332,544

3 Claims. (Cl. 56—122)

This invention relates to improvements in combines which cut and thresh grain as it moves over the field. In machines of this character there is a difficulty, particularly in harvesting soy beans, because large bunches of the straw or vines are thrown on the field and act to kill the grass underneath. To prevent this, it has been the practice for the farmer to employ a hand fork so as to spread the vines or straw over the field.

Some combines are provided with straw spreaders, but ofttimes they permit large bunches of straw or the like to be deposited with the result above mentioned.

The primary purpose of my invention is to supply a combine with cutting means arranged to finely cut the straw or the like after it leaves the straw conveyor and before it is deposited on the straw spreader, so as to eliminate the likelihood of bunches of straw or the like being deposited.

Another object of the invention is to provide an attachment which may be mounted on a conventional combine, and which will act to shred or finely cut the straw prior to its reaching the straw spreaders.

With the foregoing objects outlined and with other objects in view which will appear as the description proceeds, the invention consists in the novel features hereinafter described in detail in connection with the accompanying drawing and more particularly pointed out in the appended claims.

Figure 1:
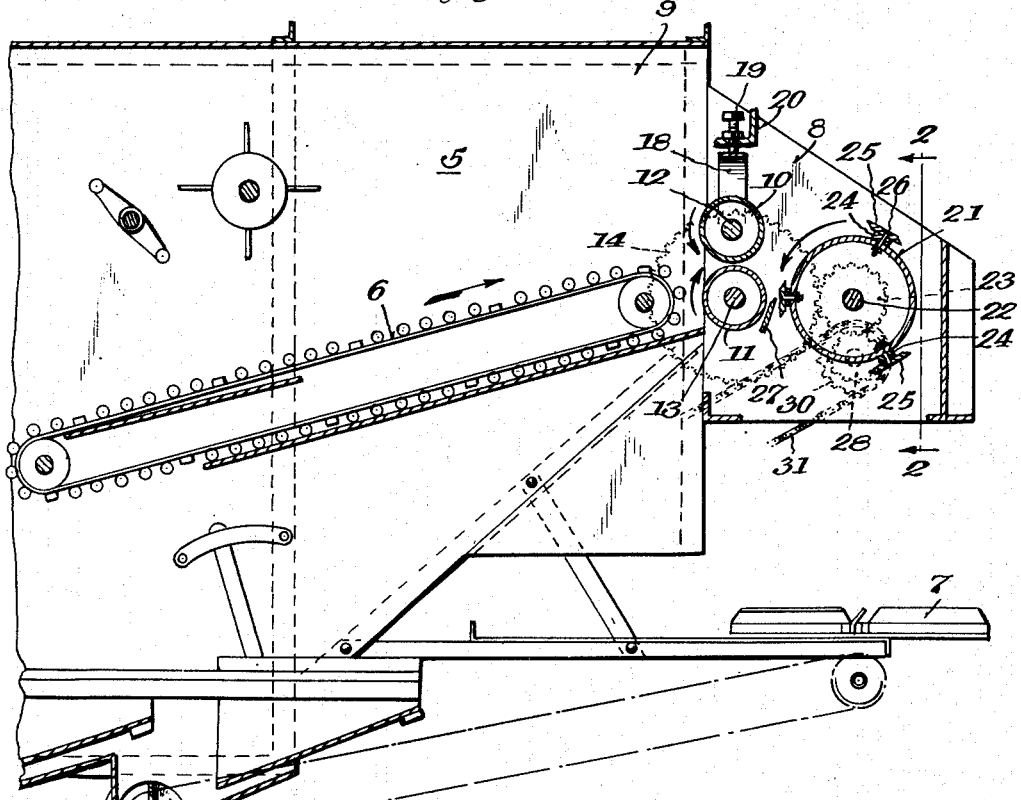
Fig. 1 is longitudinal vertical sectional view of the straw delivery end of a combine provided with my improvements.
Figure 2:
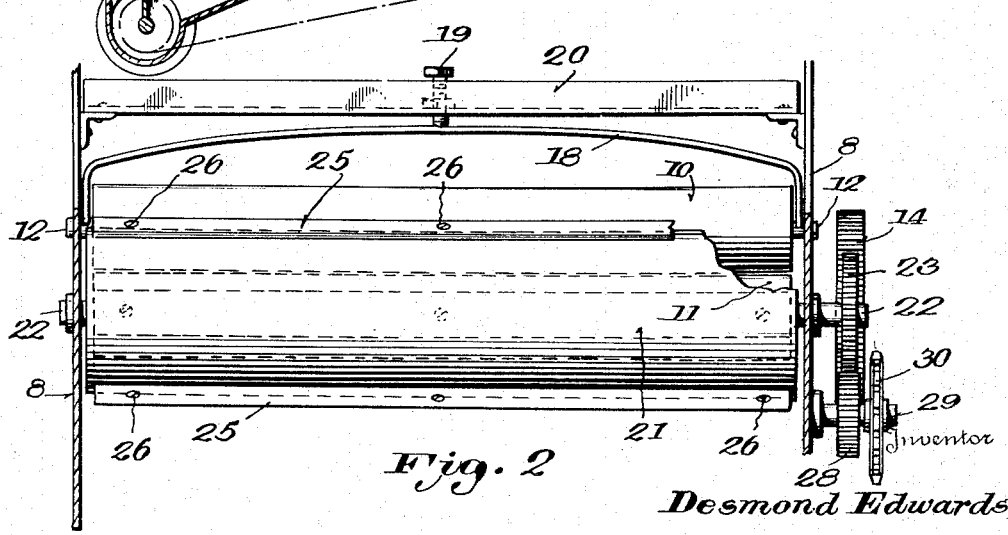
Fig. 2 is a transverse vertical sectional view taken on the line 2—2 of Fig. 1.

Referring to the drawing, 5 designates the discharge end portion of a conventional combine in which the grain or beans are removed from the straw or vines by conventional mechanism and the straw is carried to the tail of the machine on a straw carrier 6 and discharged on to a straw spreader 7.

In accordance with my invention, a housing 8 is secured to the housing 9 of the combine by any suitable means. In the housing 8, there are arranged upper and lower pressing or conveying rollers 10 and 11 having respectively shafts 12 and 13 mounted in suitable bearings in opposite walls of the housing. One end of the shaft 13 extends through a wall of the housing and carries a gear 14 rigidly fixed to the shaft.

The shaft of the upper roller is preferably vertically movable and may yield upwardly against a bow spring 18 which is adjusted by any suitable means such as a screw 19 which extends through a cross bar 20 of the housing.

The rollers are arranged to receive the straw, vines or the like as they leave the conveyor 6 and to feed the same toward a chopping cylinder 21. This cylinder is rigidly mounted on a shaft 22 which extends through one wall of the housing 8 and is provided with a fixedly connected gear 23 that meshes with the gear 14, and drives the latter. The cylinder is provided at its periphery with spacing blocks 24 serving as supports or abutments for cutting blades 25, each of which is arranged substantially parallel with the shaft 22 and extends substantially the full length of the cylinder. The blades may be detachably secured in position by means of bolts 26, and they cooperate with a stationary cutter 27 that is positioned between the cylinder and the lower conveyor roller 11.

The gear 23 may be driven by any suitable means. For example, it may mesh with a pinion 28 supported by a stub shaft 29 secured to one side of the housing. The pinion may be rigidly united with a sprocket wheel 30 driven by a sprocket chain 31 from some suitable rotatable part of the combine.

In operation, it will be understood that the rollers 10 and 11 and cylinder 21 will continuously rotate as the combine moves over the field, and the fodder, stalks or hay coming from the combine pass between the rollers and is delivered by them to the cutting edges on the revolving cylinder. As these knives revolve their edges come in contact with the shear plate 27. Consequently, as the hay or the like comes from the knives it is in shreaded or finely cut condition, and in this condition it falls upon the straw spreader, which, as usual, revolves upon a platform from which the straw or stalks are distributed over the field.

While I have disclosed a preferred embodiment of the invention in such manner that it may be readily understood by those skilled in the art, I am aware that changes may be made in the details disclosed without departing from the spirit of the invention as expressed in the claims.

What I claim and desire to secure by Letters Patent is:

1. In a combine of the type having a straw conveyor and a rotary straw spreader arranged below the discharge end of said conveyor, an attachment secured to the combine at the discharge end of the conveyor and positioned immediately above said spreader, said attachment comprising a housing, a pair of feeding rollers, a stationary ledger plate arranged adjacent to one of said rollers, a revolving cutter having blades cooperating with the ledger plate, and means for rotating the rollers and revolvable cutter.

2. In a combine of the type having a straw conveyor and a rotary straw spreader arranged below the discharge end of said conveyor, an attachment secured to the combine at the discharge end of the conveyor and positioned immediately above said spreader, said attachment comprising a housing, a pair of feeding rollers, a stationary ledger plate arranged adjacent to one of said rollers, a revolving cutter having blades cooperating with the ledger plate, and means for rotating the rollers and revolvable cutter, one of the rollers being yieldable relative to the other, and adjustable means for varying the yielding characteristics of the yielding roller.

3. In a combine, a straw conveyor adapted to discharge straw from the combine, a rotatable straw spreader arranged below the discharge end of the straw conveyor, and a straw cutter structure secured to the combine at the discharge end of the conveyor and positioned directly above said spreader and adapted to finely cut the straw as it leaves the conveyor and before it falls upon the spreader.

DESMOND EDWARDS.